(12) United States Patent
Huh et al.

(10) Patent No.: US 12,169,291 B2
(45) Date of Patent: Dec. 17, 2024

(54) STEREOSCOPIC IMAGE DISPLAY DEVICE AND A METHOD OF MANUFACTURING THE SAME

(71) Applicant: SAMSUNG DISPLAY CO., LTD., Yongin-si (KR)

(72) Inventors: Su Jung Huh, Yongin-si (KR); Jeong Woo Park, Yongin-si (KR); Saet Byeol Shin, Yongin-si (KR); Su Bin Jung, Yongin-si (KR)

(73) Assignee: SAMSUNG DISPLAY CO., LTD, Yongin-si (KR)

( * ) Notice: Subject to any disclaimer, the term of this patent is extended or adjusted under 35 U.S.C. 154(b) by 0 days.

(21) Appl. No.: 18/081,861

(22) Filed: Dec. 15, 2022

(65) Prior Publication Data

US 2023/0236435 A1    Jul. 27, 2023

(30) Foreign Application Priority Data

Jan. 26, 2022   (KR) .......................... 10-2022-0011740

(51) Int. Cl.
| | |
|---|---|
| G02B 30/27 | (2020.01) |
| G02B 30/10 | (2020.01) |
| G02F 1/01 | (2006.01) |
| G02F 1/1333 | (2006.01) |
| G02F 1/1335 | (2006.01) |
| B29D 11/00 | (2006.01) |

(52) U.S. Cl.
CPC .......... *G02B 30/10* (2020.01); *G02F 1/0136* (2013.01); *G02F 1/133354* (2021.01); *G02F 1/133512* (2013.01); *G02F 1/133526* (2013.01); *B29D 11/00365* (2013.01); *G02F 2202/28* (2013.01)

(58) Field of Classification Search
None
See application file for complete search history.

(56) References Cited

U.S. PATENT DOCUMENTS

| | | |
|---|---|---|
| 8,390,934 B2 | 3/2013 | Kong et al. |
| 8,582,062 B2 | 11/2013 | Kim et al. |
| 8,692,765 B2 | 4/2014 | Yeh et al. |
| 9,645,406 B2 | 5/2017 | Yoon et al. |
| 9,645,407 B2 | 5/2017 | Kim et al. |
| 9,869,877 B2 | 1/2018 | Kim |
| 10,663,772 B2 | 5/2020 | Kim et al. |
| 10,816,870 B2 | 10/2020 | Kim et al. |
| 2010/0182686 A1* | 7/2010 | Fukushima ............ G02B 30/27 359/463 |

(Continued)

FOREIGN PATENT DOCUMENTS

| | | |
|---|---|---|
| KR | 10-1096555 | 12/2011 |
| KR | 10-1212336 | 12/2012 |

(Continued)

*Primary Examiner* — Thanh Nhan P Nguyen
(74) *Attorney, Agent, or Firm* — F. CHAU & ASSOCIATES, LLC

(57) ABSTRACT

A stereoscopic image display device including: a display panel including pixels; a lens array disposed on the display panel, wherein the lens array includes a lens layer which includes an optically anisotropic material, and a planarization layer which covers the lens layer and includes an optically isotropic polymer; and a light shielding pattern disposed on the lens array, and overlapping a boundary between lenses of the lens array.

17 Claims, 7 Drawing Sheets

(56) References Cited

U.S. PATENT DOCUMENTS

2014/0022619 A1\* 1/2014 Woodgate .......... G02B 27/0093
                                                            359/240
2019/0086695 A1\* 3/2019 Kim ................. G02F 1/133365

FOREIGN PATENT DOCUMENTS

| KR | 10-1495758      | 2/2015 |
| KR | 10-2015-0078196 | 7/2015 |
| KR | 10-1721325      | 3/2017 |
| KR | 10-2018-0053936 | 5/2018 |
| KR | 10-1861616      | 5/2018 |
| KR | 10-1866193      | 6/2018 |
| KR | 10-1876529      | 7/2018 |
| KR | 10-1886792      | 8/2018 |
| KR | 10-1886793      | 8/2018 |
| KR | 10-1950379      | 2/2019 |
| KR | 10-2207192      | 1/2021 |

\* cited by examiner

STEREOSCOPIC IMAGE DISPLAY DEVICE AND A METHOD OF MANUFACTURING THE SAME

CROSS-REFERENCE TO RELATED APPLICATION

The present application claims priority under 35 U.S.C. § 119 to Korean patent application No. 10-2022-0011740, filed on Jan. 26, 2022, the disclosure of which is incorporated by reference herein in its entirety.

TECHNICAL FIELD

Various embodiments of the present disclosure relate to a display device, and more particularly, to a stereoscopic image display device for displaying a three-dimensional (3D) image and a method of manufacturing the display device.

DESCRIPTION OF THE RELATED ART

A stereoscopic image display device is a display device capable of conveying depth perception to a viewer by means of stereopsis or binocular vision. For example, the stereoscopic image display device may provide different images to the left and right eyes of a viewer so that the viewer can view the stereoscopic image with depth perception due to binocular parallax between the left and right eyes.

Recently, glassless methods of stereoscopic image display in which stereoscopic glasses are not worn have been developed. Of the glassless methods, there is a lenticular method and a barrier method. In the lenticular method, left and right eye images are separated using a cylindrical lens array, and in the barrier method left and right eye images are separated using a barrier.

SUMMARY

Various embodiments of the present disclosure provide a stereoscopic image display device including a lens layer made of an optically anisotropic material, a lens array which covers the lens layer and includes a planarization layer made of an optically isotropic polymer, and a light shielding pattern overlapping a boundary between lenses.

Furthermore, various embodiments of the present disclosure provide a method of manufacturing a stereoscopic image display device including a lens array formed directly on a polarization control layer.

An embodiment of the present disclosure may provide a stereoscopic image display device including: a display panel including pixels; a lens array disposed on the display panel, wherein the lens array includes a lens layer which includes an optically anisotropic material, and a planarization layer which covers the lens layer and includes an optically isotropic polymer; and a light shielding pattern disposed on the lens array, and overlapping a boundary between lenses of the lens array. The lens array may refract light provided from the display panel to form a light field.

The stereoscopic image display device may further include: a polarization control layer disposed between the lens array and the display panel.

The polarization control layer may further include: a first base layer attached to the display panel by a transparent adhesive material; a lower electrode layer disposed on the first base layer; an upper electrode layer facing the lower electrode layer; and a liquid crystal layer disposed between the lower electrode layer and the upper electrode layer, and including liquid crystal molecules.

The lens layer may contact the upper electrode layer.

The optically anisotropic material of the lens layer may include a photo-cured reactive mesogen.

The light shielding pattern may contact an upper surface or a lower surface of the upper electrode layer.

The lens array may further include: a second base layer disposed between the upper electrode layer and the lens layer.

The optically anisotropic material of the lens layer may include at least one of a photo-cured reactive mesogen and a flowable liquid crystal polymer.

The light shielding pattern may be in contact with an upper surface of the second base layer.

The light shielding pattern may be disposed on a lower surface of the second base layer, and contact the upper electrode layer.

The lower electrode layer and the upper electrode layer may include a transparent conductive material.

The optically anisotropic material of the lens layer may include a liquid crystal polymer.

The stereoscopic image display device may further include: a base layer attached to the display panel by a transparent adhesive material; a lower electrode layer including electrodes disposed between the base layer and the lens layer; and an upper electrode layer disposed on the planarization layer.

The light shielding pattern may be disposed between the electrodes of the lower electrode layer.

The stereoscopic image display device may further include: a transparent substrate disposed on the lens array.

An embodiment of the present disclosure may provide a method of manufacturing a stereoscopic image display device, the method including: forming, on a first substrate, a planarization layer including an optically isotropic polymer to define a lens surface for a lens array; providing a lens layer including an optically anisotropic material on the lens surface; providing an upper electrode layer on a lower surface of the lens layer, wherein the lower surface of the lens layer is opposite to the lens surface; forming a lower electrode layer on an upper surface of a second substrate; providing a liquid crystal layer including liquid crystal molecules between the upper electrode layer and the lower electrode layer; coupling the first substrate with the second substrate; and attaching the second substrate to a display panel using a transparent adhesive material.

The optically anisotropic material of the lens layer may include a photo-cured reactive mesogen.

Providing the upper electrode layer may include: patterning, on the lower surface of the lens layer, a light shielding pattern overlapping a boundary between lenses of the lens array of the lens layer; and depositing, on the lower surface of the lens layer, the upper electrode layer contacting at least a portion of the light shielding pattern.

The upper electrode layer may contact the lens layer.

Providing the upper electrode layer may include: patterning, on the lower surface of the upper electrode layer, the light shielding pattern overlapping the boundary between lenses of the lens array of the lens layer.

DETAILED DESCRIPTION OF THE EMBODIMENTS

Figure 1:
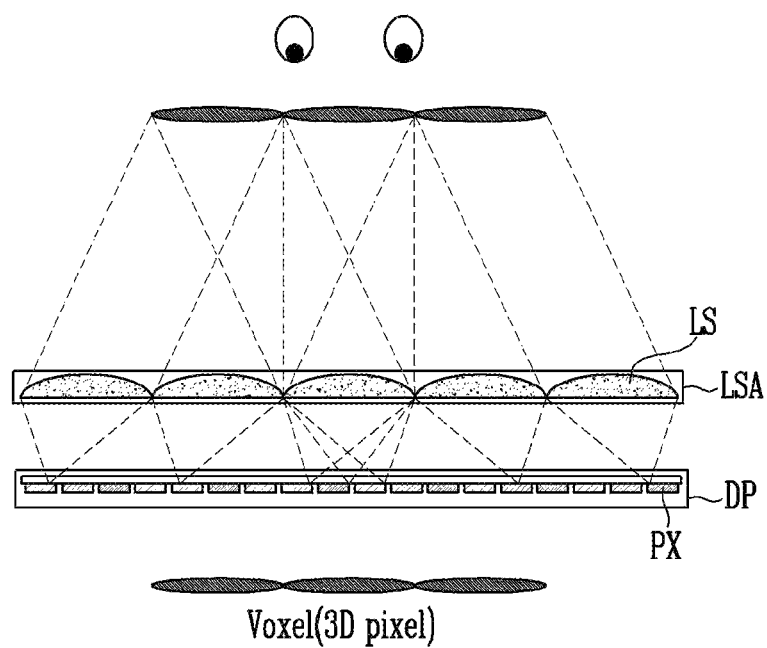
FIG. 1 is a diagram for explaining a lens array type of stereoscopic image display device.

Various embodiments of the present disclosure will hereinafter be described in detail with reference to the accompanying drawings. The same reference numerals are used throughout the drawings to designate the same components, and thus, repetitive description of the same components may be omitted.

Although the embodiments described herein are intended to convey the scope of the present disclosure to those skilled in the art, the present disclosure is not limited thereto. It should be understood that various changes and modifications may be made thereto without departing from the scope of the present disclosure.

The accompanying drawings are provided for the purpose of easily describing particular embodiments, and may be exaggerated as necessary to aid in understanding of the present disclosure. The present disclosure is not limited to the embodiments shown in the drawings.

Figure 2:
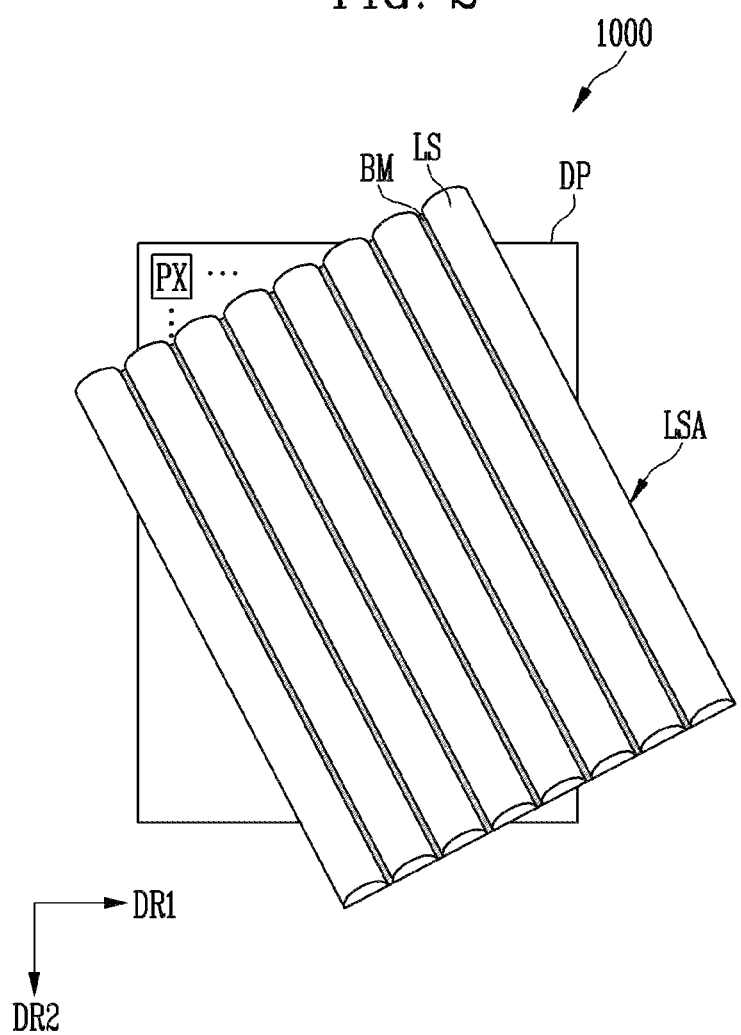
FIG. 2 is a diagram schematically illustrating a stereoscopic image display device in accordance with embodiments of the present disclosure.

FIG. 1 is a diagram for explaining a lens array type of stereoscopic image display device, and FIG. 2 is a diagram schematically illustrating a stereoscopic image display device in accordance with embodiments of the present disclosure.

Referring to FIGS. 1 to 2, the stereoscopic image display device 1000 may include a display panel DP and a lens array LSA.

The display panel DP may include pixels PX which emit light to display an image. In an embodiment, each of the pixels PX may output one of red light, green light, and blue light. However, this is merely illustrative, and the color of the light emitted from the pixel PX is not limited thereto. For example, various colors of light may be output by the pixels PX to realize full colors.

In an embodiment, the display panel DP may be connected to a driving circuit which drives the pixels PX. The driving circuit may perform at least one function of a scan driver, a data driver, and a timing controller. For example, the driving circuit may be located on the rear surface of the display panel DP. The driving circuit may also be located at one or more sides of the display panel DP In an embodiment, the pixels PX may be disposed on the front surface of the display panel DP to form a light emitting surface. An image may be displayed through the pixels PX. The pixels PX may form a plurality of pixel rows and a plurality of pixel columns. Here, each of the pixel rows may refer to a pixel group connected to the same scan line, while each of the pixel columns may refer to a pixel group connected to the same data line. For example, the pixel rows may be arranged in a second direction DR2, the pixel columns may be arranged in a first direction DR1.

In an embodiment, the display panel DP may include a pixel circuit layer and a display element layer disposed on a substrate to form the pixel PX. The display panel DP may further include an encapsulation structure which encapsulates the display element layer. Furthermore, the display panel DP may further include a polarization layer including a retarder and/or a polarizer on the encapsulation structure.

The pixel circuit layer may include a pixel circuit configured to drive a light emitting element of the pixel PX. For example, the pixel circuit layer may include transistors and signal lines/power lines connected to the transistors. The pixel circuit layer may have a stacked structure for forming the transistors.

The display element layer ay be disposed on the pixel circuit layer. The display element layer may include light emitting elements. The light emitting elements may be electrically connected to the pixel circuits of the pixel circuit layer. In an embodiment, the light emitting element may be a self-emissive element. The self-emissive element may include an organic light emitting element, an inorganic light emitting element, or a light emitting element formed of an inorganic material and an organic material in combination. In other words, the display panel DP may be a self-emissive display panel. However, this is merely illustrative, and the light emitting element may include a light emitting element (e.g., a quantum dot display element) which changes the wavelength of light emitted using quantum dots and then emits light.

The display panel DP may be implemented as a liquid crystal display panel, a plasma display panel, a display panel which displays an image using quantum dots, or the like.

The lens array LSA may be disposed on the display panel DP, and may include lenses LS which refract light incident from the pixels PX. For example, the lens array LSA may be implemented as a lenticular lens array, a micro lens array, or the like.

A light field display is a three-dimensional (3D) display which forms a light field expressed by a vector distribution (e.g., intensity, direction) of light on a space using a flat panel display and an optical element (e.g., the lens array (LSA)) to realize a 3D image. The light field display is a display technology which can be used in various applications by fusion with augmented reality (AR) technology, etc. because the light field display may see the depth and side of an object and thereby realize a more natural 3D image.

The light field may be implemented in various ways. For example, the light field may be formed by a method of making a multi-directional light field using multiple projectors, a method of controlling the direction of light using a diffraction grating, a method of controlling the direction and intensity (e.g., luminance) of light according to the combination of each pixel using two or more panels, a method of controlling the direction of light using a pinhole or a barrier, a method of controlling the refraction direction of light through the lens array, etc.

In an embodiment, as illustrated in FIG. 1, the lens array type of stereoscopic image display device 1000 may display the stereoscopic image (3D image) by forming the light field.

A series of pixels PX may be allocated to each lens LS, and the light emitted from each pixel PX may be refracted by the lens LS to travel only in a specific direction dictated by the lens LS, thus forming the light field expressed by the intensity and direction of light. When a viewer looks at the stereoscopic image display device in the light field formed in this way, the viewer can feel the three-dimensional effect of a corresponding image.

Image information according to a viewer's viewpoint in the light field may be processed in the unit of a 'voxel'. The voxel may be graphic information defining a certain point (or pixel) in a 3D space.

In an embodiment, the lens array LSA may include semi-cylindrical lenses LS (e.g., lenticular lenses) extending in one direction. For example, as illustrated in FIG. 2, the lenses LS may be disposed at an angle with the first direction DR1 to extend and have a slanted arrangement with respect to the first direction DR1. However, this is merely illustrative, and the extension direction (and arrangement direction) of the lenses LS is not limited thereto.

The size and arrangement of the lens LS may be determined by conditions such as the size of a pixel area PXA, a viewing distance, a pixel size, a resolution, and a pixel arrangement structure.

In an embodiment, the lens LS may include a micro lens instead of the lenticular lens. When observed in a plan view, the micro lens may have a shape such as a hexagon, a circle, or an ellipse.

In an embodiment, a light shielding pattern BM may be disposed under the lens array LSA. The light shielding pattern BM may overlap a boundary between the lenses LS. In other words, the light shielding pattern BM may form a boundary between adjacent lenses LS.

At the boundary between the lenses LS, the influence of interference caused by the diffraction of the emitted light may be increased, and a display quality may be deteriorated due to the crosstalk of the stereoscopic image caused by the interference. In addition, additional image distortion may be recognized due to the lens aberration or the like. To reduce the crosstalk and image distortion, the light shielding pattern BM may be disposed under the lens array LSA to overlap the boundary between adjacent lenses LS.

Figure 3:
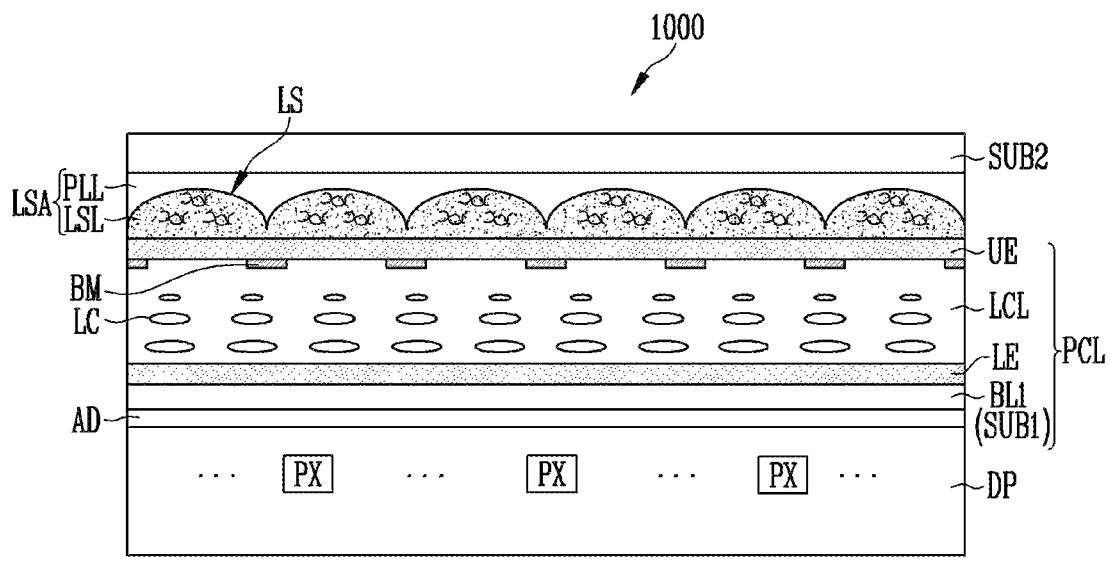
FIG. 3 is a cross-sectional view illustrating an example of a stereoscopic image display device.

FIG. 3 is a cross-sectional view illustrating an example of a stereoscopic image display device.

Referring to FIGS. 1, 2, and 3, the stereoscopic image display device 1000 may include a display panel DP, a polarization control layer PCL, a lens array LSA, and a light shielding pattern BM.

The polarization control layer PCL may be disposed between the lens array LSA and the display panel DP. The polarization control layer PCL may control the polarization of light incident from the display panel DP.

The polarization control layer PCL may include a first base layer BL1 (or a first transparent substrate SUB1), a lower electrode layer LE, a liquid crystal layer LCL, and an upper electrode layer UE.

The first base layer BL1 may be disposed on the display panel DP. In an embodiment, the first base layer BL1 may be attached to the display panel DP through a transparent adhesive material AD. The transparent adhesive material AD may include an optically clear adhesive (OCA) or optically clear resin (OCR).

The first base layer BL1 may be formed of a transparent insulating material. Examples of the first base layer BL1 may be an organic material selected from a group including polyethersulphone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (SAC), and cellulose acetate propionate (CAP).

In an embodiment, the first base layer BL1 may be formed of inorganic material. For instance, the first base layer BL1 may include a silicon nitride layer, a silicon oxynitride layer, a silicon oxide layer, a titanium oxide layer, or an aluminum oxide layer.

The lower electrode layer LE may be disposed on the first base layer BL1. For example, the lower electrode layer LE may directly contact the first base layer BL1. The lower electrode layer LE may include transparent conductive material such as indium tin oxide (ITO). A reference voltage used as a reference for turning on/off the driving of the liquid crystal layer LCL may be supplied to the lower electrode layer LE.

In an embodiment, at least one of a lower alignment layer and a lower insulating layer may be further disposed on the lower electrode layer LE to cover the lower electrode layer.

The upper electrode layer UE may be disposed to be opposite to the lower electrode layer LE. In other words, the upper electrode layer UE may face the lower electrode layer LE. The upper electrode layer UE may include a transparent conductive material such as ITO. A driving voltage for turning on/off the driving of the liquid crystal layer LCL may be supplied to the upper electrode layer UE. An electric field may be formed between the upper electrode layer UE and the lower electrode layer LE depending on whether the driving voltage is applied, and the alignment direction of liquid crystal molecules LC included in the liquid crystal layer LCL may be controlled.

However, this is merely illustrative. The driving voltage may be supplied to the lower electrode layer LE, and the reference voltage may be supplied to the upper electrode layer UE.

In an embodiment, at least one of an upper alignment layer and an upper insulating layer may be further disposed between the upper electrode layer UE and the liquid crystal layer LCL.

The liquid crystal layer LCL may be disposed between the lower electrode layer LE and the upper electrode layer UE. The liquid crystal layer LCL may include the liquid crystal molecules LC whose alignment direction is controlled according to a voltage applied to the upper electrode layer UE.

In an embodiment, the liquid crystal layer LCL may be driven in a twisted nematic (TN) liquid crystal mode having the phase difference of $\lambda/2$. However, this is merely illustrative. The liquid crystal layer LCL may be driven in a liquid crystal mode such as vertical alignment (VA), optical compensated bend (OCB), or electrically controlled birefringence (ECB).

For example, in a state in which no electric field is applied to the liquid crystal molecules LC in the TN liquid crystal mode, the liquid crystal molecules LC are arranged (e.g., aligned) to rotate the vertical linear polarized light of the incident light by 90° and thereby change the vertical linear polarized light into horizontal linear polarized light. Thus, the liquid crystal layer LCL may linearly polarize the light incident from the display panel DP in the horizontal direction to transmit the light. The linearly polarized light in the horizontal direction may be provided to the lens array LSA, and an image may be displayed in a two-dimensional (2D) image mode.

On the other hand, in a stereoscopic image mode (or 3D image mode), the driving voltage may be applied to the upper electrode layer UE, and the electric field may be formed between the upper electrode layer UE and the lowerelectrode layer LE. The liquid crystal molecules LC may be arranged (e.g., aligned) to transmit incident light by the formed electric field as it is. For example, the light having a vertical polarization axis, which is incident from the display panel DP, may be incident on the lens array LSA as it is. The light refracted by the lens array LSA may be divided into the traveling path of light corresponding to a right-eye image and the traveling path of light corresponding to a left-eye image, and may converge on different focuses of the viewer's eyes to realize a stereoscopic image.

The lens array LSA may refract light provided from the polarization control layer PCL to form the light field. The lens array LSA may include a lens layer LSL and a planarization layer PLL. The lens array LSA may be directly disposed on the polarization control layer PCL without an intermediate medium, In other words, the lens array LSA may be directly disposed on the upper electrode layer UE.

In an embodiment, the lens layer LSL may be directly disposed on the upper electrode layer UE. For instance, a material forming the upper electrode layer UE may be directly deposited on the lower surface of the lens layer LSL.

In an embodiment, the lens layer LSL may include the array of lenses LS having a semi-cylindrical convex shape. For example, the lens LS may be the lenticular lens. However, this is merely illustrative, and the lens LS may be a micro lens having the area of a micro size.

The lens layer LSL may include an optically anisotropic material. For example, the inside of the lens layer LSL may be formed of a reactive mesogen. In other words, since the lens layer LSL has a mesogenic structure, the lens layer LSL may form a liquid crystal phase.

The material filling the lens layer LSL may be formed to have the liquid crystal phase by being cured in response to light such as ultraviolet rays. Thus, the inside of the lens layer LSL may have an optically anisotropic stationary phase. For instance, the lens layer LSL may have different major-axis refractive indices and minor-axis refractive indices.

The planarization layer PLL may be disposed to cover the lens layer LSL. The planarization layer PLL may have a substantially flat upper surface, and may be formed of an optically isotropic polymer.

For instance, the planarization layer PLL may include an optically isotropic material having a refractive index which is substantially the same as the major-axis refractive index or the minor-axis refractive index of the lens layer LSL.

If the light incident from the polarization control layer PCL vibrates along an axial direction having a refractive index different from that of the planarization layer PLL, the light may be refracted and emitted at an interface based on a difference in refractive index between the lens layer LSL and the planarization layer PLL. In this case, the stereoscopic image may be displayed by the refraction of the emitted light.

If the light incident from the polarization control layer PCL vibrates along the axial direction having the same refractive index as that of the lens layer LSL and the planarization layer PLL, the incident light may be directly emitted as the incident light vibrates.

As such, the 3D image may be realized by a relationship between the vibrating direction of the incident light provided to the lens array LSA and the refractive indices of the lens layer LSL and the planarization layer PLL.

In an embodiment, a second transparent substrate SUB2 may be disposed on the planarization layer PLL. For example, the second transparent substrate SUB2 may serve as a substrate (e.g., a mother substrate) for forming/preparing the lens array LSA. In addition, the second transparent substrate SUB2 may be used to protect the lens array LSA disposed thereunder from external contamination, impact, scratches, and the like.

In an embodiment, the second transparent substrate SUB2 may be formed of a transparent insulating material. The second transparent substrate SUB2 may include a transparent organic material or a transparent inorganic material which may form the first base layer BL1 described above. For example, the second transparent substrate SUB2 may have the same material as the first base layer BL1.

In an embodiment, the lens array LSA including the lens layer LSL having the photo-cured reactive mesogen and the planarization layer PLL and the second transparent substrate SUB2 may be provided in the form of a film.

On the other hand, in case that the lens layer LSL is formed using flowable liquid crystal polymer, the liquid crystal polymer may flow out of the lens LS. An additional substrate (or additional base layer) may then be interposed between the lens layer LSL and the upper electrode layer UE to prevent the liquid crystal polymer from flowing out of the lens. The flowable liquid crystal polymer of the lens layer LSL may be aligned according to the electric field formed in the lens layer LSL. Such a lens array may be referred to as a liquid crystal type of lens array. The liquid crystal type of lens array may have issues with reliability such as the crystallization of liquid crystals under low temperature conditions.

Furthermore, in the stereoscopic image display device having the liquid crystal type of lens array, the thickness of the lens array LSA is increased by additional substrates, and thereby the focal distance, which is the distance from the pixel PX to the lens LS, is increased.

The focal distance is a major factor in determining optical properties such as the viewing angle of the stereoscopic image. As the focal distance decreases, the viewing angle may increase, and the image quality of the stereoscopic image may be improved. In particular, the viewing angle may be increased due to a reduction in the focal distance caused by a reduction in the thickness of the lens array LSA.

In the stereoscopic image display device 1000 according to embodiments of the present invention, the lens array LSA including the lens layer LSL having the photo-cured reactive mesogen is directly disposed on the upper electrode layer UE of the polarization control layer PCL. Therefore, the substrate between the lens array LSA and the polarization control layer PCL may be removed, and the thickness of an optical structure on the display panel DP may be reduced. Accordingly, the focal distance for realizing the stereoscopic image can be reduced, so that the viewing angle can be widened, and the quality of the stereoscopic image can be improved.

In addition, since the optical bonding process of attaching substrates between the lens array LSA and the polarization control layer PCL is omitted, the manufacturing process can be simplified and the manufacturing cost can be reduced.

The light shielding pattern BM may be disposed under the lens array LSA. The light shielding pattern BM may overlap the boundary between the lenses LS. For instance, the light shielding pattern BM may extend in a diagonal direction along the boundary between the lenses LS of the slanted arrangement.

In an embodiment, the light shielding pattern BM may contact the lower surface of the upper electrode layer UE. For example, the light shielding patter BM ray be formed within the liquid crystal layer LCL. The light shielding pattern BM may be formed by a patterning method. The light shielding pattern BM may absorb or block light emitted from below.

In an embodiment, the width of the light shielding pattern BM may be less than 40% of the pitch of the lens LS. For example, the width of the light shielding pattern BM may be formed to be about 1% to about 2% of the pitch of the lens LS.

In an embodiment, the light shielding pattern BM may include an organic light shielding material. For example, the organic light shielding material may include at least one of carbon black (CB) and titanium black (TiBK), but is not limited thereto.

A slit may be formed between adjacent light shielding patterns BM, and optical interference such as diffraction may be generated by the slit. Thus, a structure for improving the deterioration of a display quality due to the slit between the light shielding patterns BM may be required.

In an embodiment, the light shielding pattern BM may include fine slits having an apodization structure for reducing diffraction at the boundary between adjacent lenses. For example, the light shielding pattern BM having the apodization structure may reduce a high-order diffraction image, and may further improve interference due to diffraction and crosstalk due to lens aberration.

According to an embodiment, the stereoscopic image display device 1000 includes: a display panel DP including pixels PX; a lens array LSA disposed on the display panel DP, wherein the lens array LSA includes a lens layer LSL which includes an optically anisotropic material, and a planarization layer PLL which covers the lens layer LSL and includes an optically isotropic polymer; and a light shielding pattern BM disposed on the lens array LSA, and overlapping a boundary between lenses LS of the lens array LSA.

Figure 4:
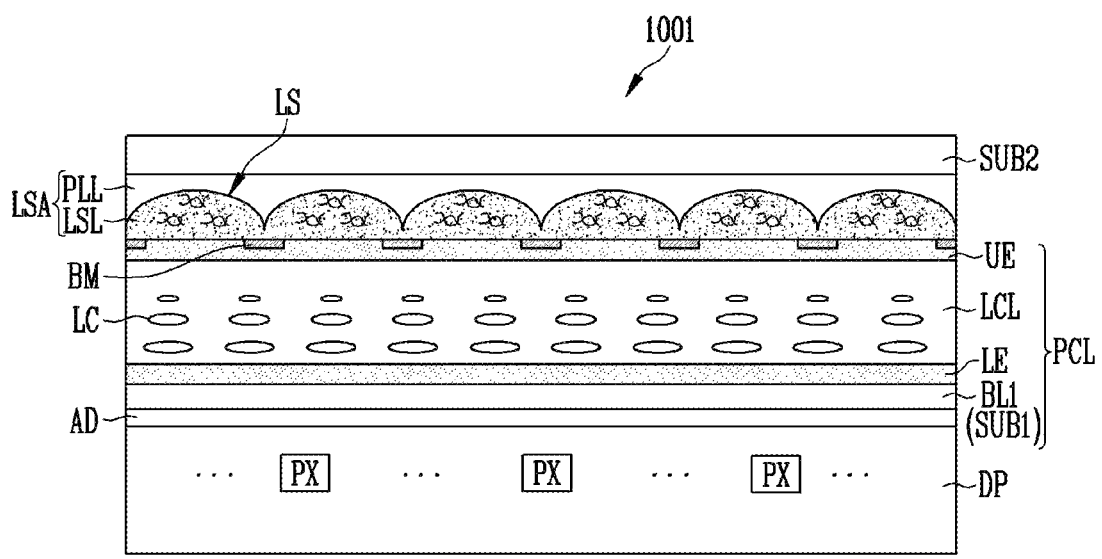
FIG. 4 is a cross-sectional view illustrating another example of a stereoscopic image display device.

FIG. 4 is a cross-sectional view illustrating another example of a stereoscopic image display device.

In FIG. 4, like reference numerals will be used to designate the same components as those described with reference to FIG. 3, and a repetitive explanation of the same components will be omitted. A stereoscopic image display device 1001 of FIG. 4, other than the configuration of the light shielding pattern BM, may have a configuration identical or similar to that of the stereoscopic image display device 1000 of FIG. 3.

Referring to FIG. 4, the stereoscopic image display device 1001 may include a display panel DP, a polarization control layer PCL, a lens array LSA, and a light shielding pattern BM.

The light shielding pattern BM may be disposed under the lens array LSA. The light shielding pattern BM may overlap the boundary between the lenses LS.

In an embodiment, the light shielding pattern BM may contact a portion of the upper surface of the upper electrode layer UE. For example, the light shielding pattern BM may be partially formed in the upper electrode layer UE. The light shielding pattern BM may directly contact the lower surface of the lens layer LSL.

For example, after the light shielding pattern BM is patterned on the lower surface of the lens layer LSL, the upper electrode layer UE may be deposited (or printed) on the lower surface of the lens layer LSL on which the light shielding pattern BM is patterned.

In this way, the light shielding pattern BM may be selectively formed at various positions depending on process conditions, the pitch and thickness of the lens LS, etc.

Figure 5:
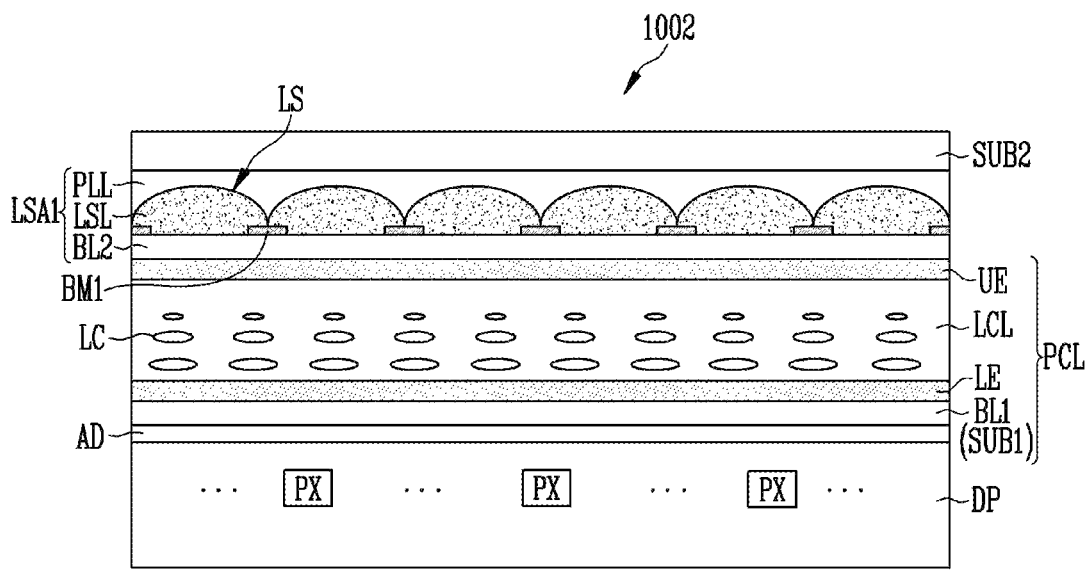
FIGS. 5, 6, and 7 are cross-sectional views illustrating other examples of a stereoscopic image display device.
Figure 6:
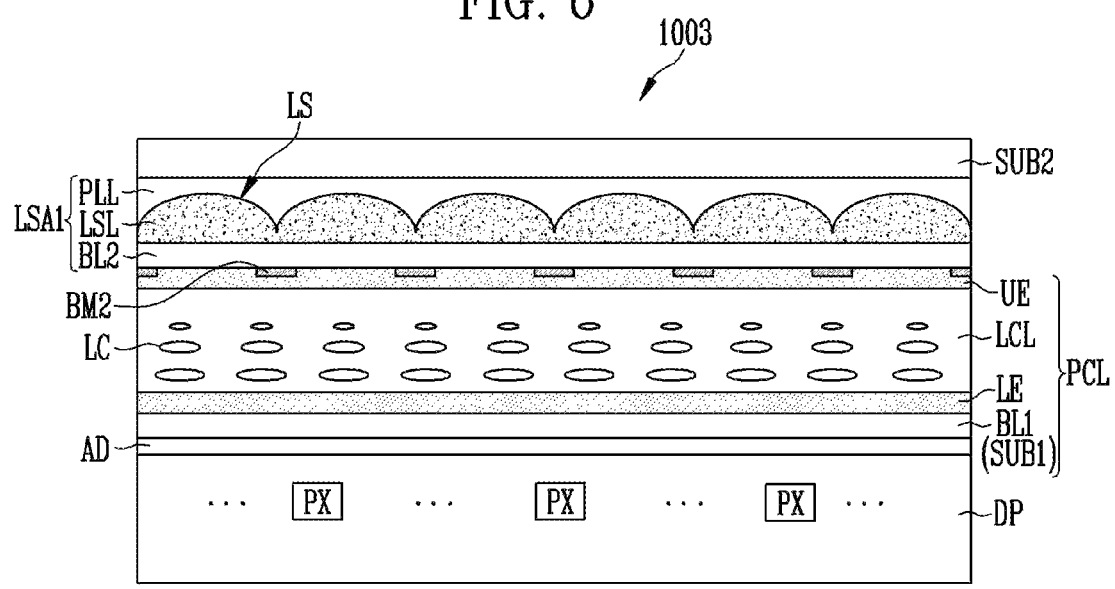
Figure 7:
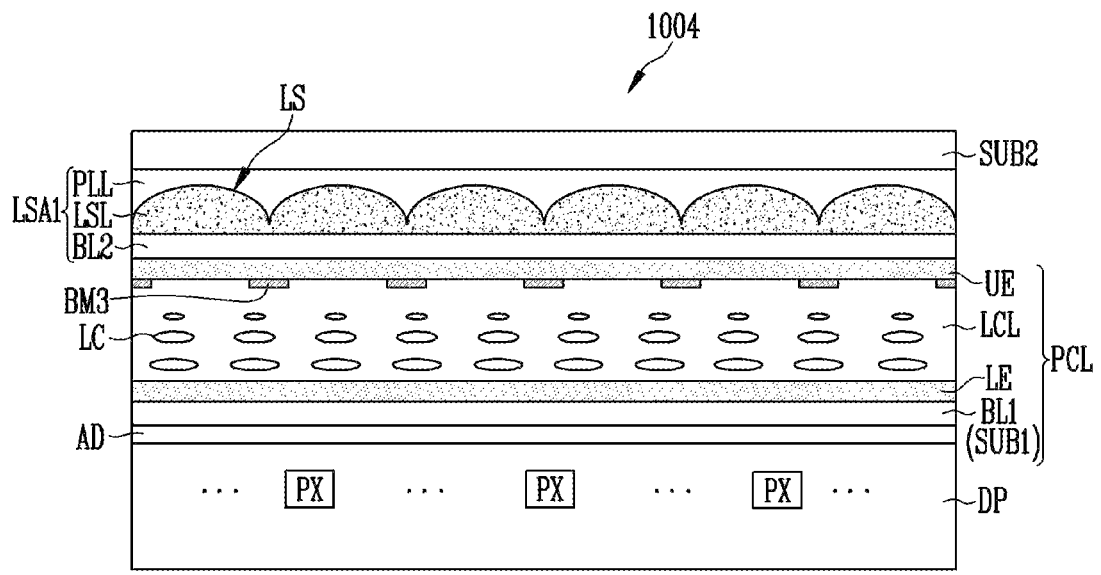

FIGS. 5, 6, and 7 are cross-sectional views illustrating other examples of a stereoscopic image display device.

In FIGS. 5, 6, and 7, like reference numerals will be used to designate the same components as those described with reference to FIG. 3, and a repetitive explanation of the same components will be omitted. Further, stereoscopic image display devices 1002, 1003, and 1004 of FIGS. 5, 6, and 7 may have a configuration which is substantially the same as or similar to that of the stereoscopic image display device 1000 of FIG. 3, except for the configuration of the second base layer BL2 and the light shielding patterns BM1, BM2 and BM3.

Referring to FIGS. 5, 6, and 7, the stereoscopic image display devices 1002, 1003, and 1004 may include a display panel DP, a polarization control layer PCL, a lens array LSA1, and light shielding patterns BM1 (FIG. 5), BM2 (FIG. 6), and BM3 (FIG. 7).

The lens array LSA1 may include a second base layer BL2, a lens layer LSL, and a planarization layer PLL.

The second base layer BL2 may be disposed on the upper electrode layer UE. For instance, the second base layer BL2 may be directly disposed on the upper electrode layer UE without an intermediate medium. In an embodiment, the upper electrode layer UE may be deposited (or printed) on the lower surface of the second base layer BL2.

The second base layer BL2 may be formed of the above-described transparent insulating material.

The lens layer LSL may be disposed on the second base layer BL2. In an embodiment, the lens layer LSL may include at least one of a photo-cured reactive mesogen and a flowable liquid crystal polymer, For example, the second base layer BL2 may be disposed to prevent the movement of the liquid crystal polymer during a manufacturing process.

In an embodiment, as shown in FIG. 5, the light shielding pattern BM1 may be disposed to contact the upper surface of the second base layer BL2. Further, the light shielding pattern BM1 may contact the lens layer LSL. In other words, the light shielding pattern BM1 may be sandwiched between the lens layer LSL and the second base layer BL2. For instance, after the light shielding pattern BM1 is patterned on the upper surface of the second base layer BL2, the lens layer LSL and the second base layer BL2 may be coupled.

In an embodiment, as shown in FIG. 6, the light shielding pattern BM2 may be disposed on the lower surface of the second base layer BL2. The light shielding pattern BM2 may contact the upper electrode layer UE. In other words, the light shielding pattern BM1 may be sandwiched between the upper electrode layer UE and the second base layer BL2. For instance, after the light shielding pattern BM2 is patterned on the lower surface of the second base layer BL2, the upper electrode layer UE may be deposited (or printed) on the lower surface of the lens layer LSL.

In an embodiment, as shown in FIG. 7, the light shielding pattern BM3 may be disposed on the lower surface of the upper electrode layer UE. For instance, after the light shielding pattern BM3 is patterned on the lower surface of the upper electrode layer UE, the liquid crystal layer LCL may be provided.

In this way, the light shielding pattern BM may be selectively formed at various positions depending on process conditions, the pitch and thickness of the lens LS, etc.

Figure 8:
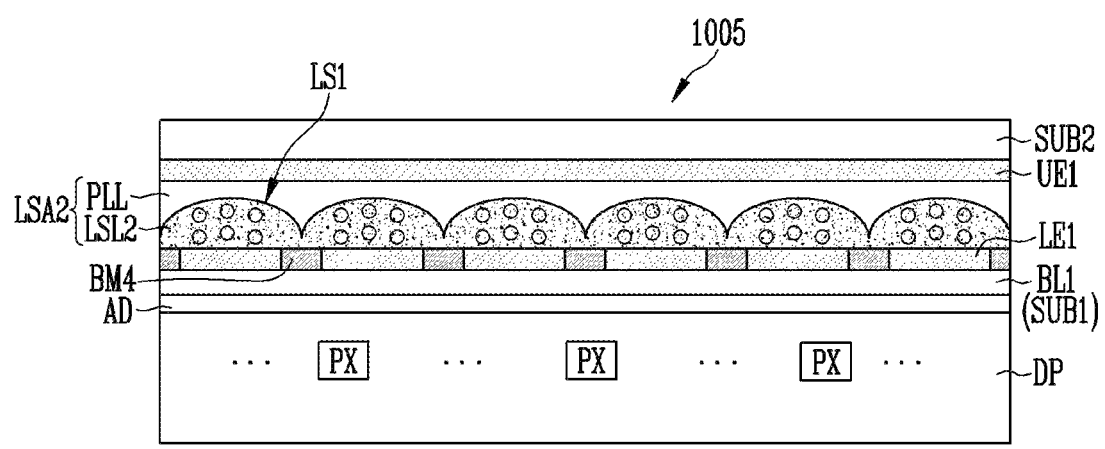
FIG. 8 is a cross-sectional view illustrating another example of a stereoscopic image display device.

FIG. 8 is a cross-sectional view illustrating another example of a stereoscopic image display device.

In FIG. 8, like reference numerals will be used to designate the same components as those described with reference to FIG. 3, and a repetitive explanation of the same components will be omitted.

Referring to FIG. 8, a stereoscopic image display device 1005 may include a display panel DP, a lens array LSA2, and a light shielding pattern BM4.

The first base layer BL1 or the first transparent substrate SUB1 may be attached to the display panel DP by the transparent adhesive material AD.

In an embodiment, the lens array LSA2 may include a lens layer LSL2 and a planarization layer PLL.

Each of lenses LS1 of the lens layer LSL2 may include Plowable liquid crystal molecules. The liquid crystal molecules may be aligned according to the electric field formed in the lens LS1.

The planarization layer PLL may cover the lens layer LSL2. The planarization layer PLL may include an isotropic polymer.

A lower electrode layer LE1 and an upper electrode layer UE1 may be disposed with the lens array LSA2 interposed therebetween to control the alignment of the liquid crystal molecules. In other words, the lens array LSA2 may be provided between the lower electrode layer LE1 and the upper electrode layer UE1.

The lower electrode layer LE1 may be patterned on the first base layer BL1. For instance, the lower electrode layer LE1 may be patterned to expose a portion of the first base layer BL1 overlapping a boundary portion between the lenses LS1. In other words, gaps may be formed in the lower electrode layer LE1.

The light shielding pattern BM4 may be disposed on the exposed first base layer BL1. In other words, the light shielding pattern BM4 may be formed in the gaps in the lower electrode layer LE1.

In an embodiment, an additional transparent base layer may be disposed between the lower electrode layer LE1 and the lens layer LSL2.

The upper electrode layer UE1 may be disposed between the planarization layer PLL and the second transparent substrate SUB2.

According to the electric field between the upper electrode layer UE1 and the lower electrode layer LE1, the alignment of the liquid crystals in the lens LS1 may be controlled, and a stereoscopic image may be realized. In this case, the pitch of the lens LS1 may be greater than the pitch of the lens LS described with reference to FIG. 3. For instance, the pitch of the lens LS including the reactive mesogen described with reference to FIG. 3 is 500 μm or less, while the pitch of the lens LS1 is several millimeters or more.

Since the polarization control layer is omitted from the stereoscopic image display device 1005 of FIG. 8, the thickness and focal distance of the optical structure on the display panel 100 may be further reduced.

FIGS. 9 to 14 are cross-sectional views illustrating a method of manufacturing a stereoscopic image display device in accordance with embodiments of the present disclosure.

Referring to FIGS. 3, 9 to 14, the method of manufacturing the stereoscopic image display device may include forming the planarization layer PLL on the second transparent substrate SUB2 (hereinafter referred to as the upper substrate), providing the lens layer LSL on a lens surface LSS of the planarization layer PLL, depositing the upper electrode layer UE on the lower surface of the lens layer LSL, depositing the lower electrode layer LE on the upper surface of the first transparent substrate SUB1 (hereinafter referred to as the lower substrate), providing the liquid crystal layer LCL between the upper electrode layer UE and the lower electrode layer LE, coupling the upper substrate SUB2 with the lower substrate SUB1, and attaching the lower substrate SUB1 to the display panel DP using the transparent adhesive material AD.

Figure 9:
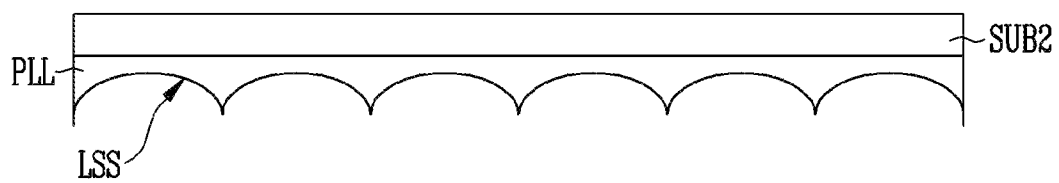
FIGS. 9, 10, 11, 12, 13 and 14 are cross-sectional views illustrating a method of manufacturing a stereoscopic image display device in accordance with embodiments of the present disclosure.

As shown in FIG. 9, the planarization layer PLL including the optically isotropic polymer may be formed on the upper substrate SUB2. The planarization layer PLL may form the lens surface LSS of the lens array LSA.

In an embodiment, the planarization layer PLL may be formed by applying the photo-curable resin including the optically isotropic polymer to a surface of the upper substrate SUB2. For instance, a mold having the shape of a lenticular lens surface may be pressed against the photo-curable resin applied to the upper substrate SUB2, and ultraviolet (UV) rays may be irradiated to the photo-curable resin in the state in which the mold is pressed, so that the planarization layer PLL having the lens surface LSS may be formed.

Alternatively, a pattern roller may be used in the process of applying the UV curable resin. The pattern roller may include a pattern having a shape corresponding to the lens surface LSS. The lens surfaces LSS may be formed through the pattern roller, and the lens surfaces LSS may be cured through the irradiation of light such as ultraviolet rays.

However, this is merely illustrative, and other methods may be applied.

Figure 10:
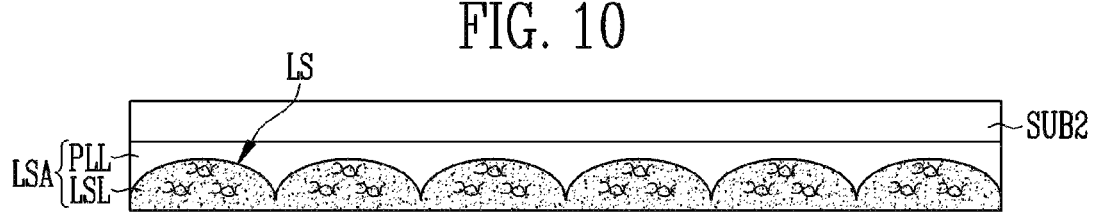

As shown in FIG. 10, the lens layer LSL made of an optically anisotropic material may be provided on the lens surface LSS of the planarization layer PLL. The reactive mesogen is included as an optically anisotropic material. When the reactive mesogen is irradiated with ultraviolet rays in an appropriate wavelength band, the optically anisotropic stationary phase may be formed through photopolymerization.

In an embodiment, the lens layer LSL may be formed by coating the lens surface LSS with a material including the reactive mesogen. For instance, the lens surface LSS may be coated with a reactive mesogen solution obtained by dissolving a reactive mesogen in an organic solvent using a coating equipment used for film coating. The reactive mesogen may be cured by evaporating the organic solvent through a heat treatment process for the coated reactive mesogen solution and exposing to ultraviolet rays. The cured reactive mesogen may have an optically anisotropic stationary phase.

Through this process, the lens array LSA formed on the upper substrate SUB2 may be provided in the form of a film. However, this is merely illustrative, and other methods may be applied.

Figure 11:
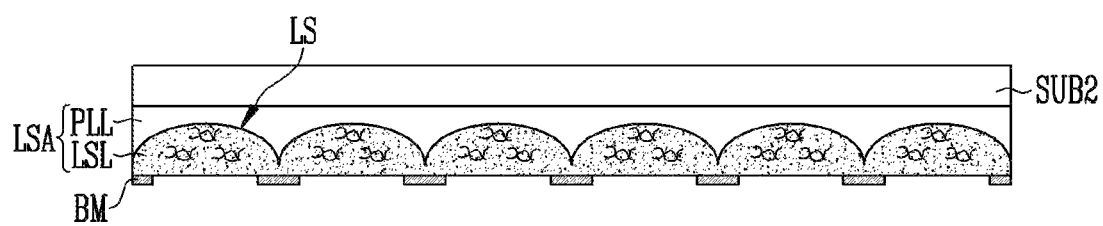

In an embodiment, as shown in FIG. 11, the light shielding pattern BM may be patterned on the lower surface of the lens layer LSL. The light shielding pattern BM may be formed to overlap the boundary between the lenses LS. It is to be understood that the boundary between adjacent lenses LS may include a portion of the lens layer LSL. For instance, the light shielding pattern BM may be formed on the lower surface of the lens layer LSL through a printing process using a mask or a photoresist process. However, this is merely illustrative, and other methods may be applied.

Figure 12:
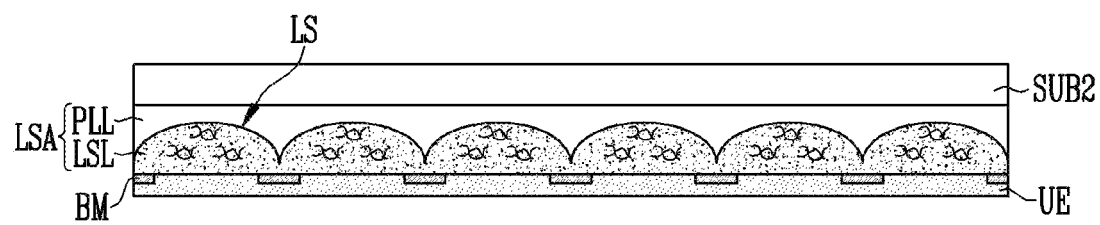

As shown in FIG. 12, the upper electrode layer UE contacting at least a portion of the light shielding pattern BM may be deposited on the lower surface of the lens layer LSL. For example, the upper electrode layer UE may overlap at least three sides of the light shielding pattern BM. The upper electrode layer UE may include transparent conductive material such as ITO.

The upper electrode layer UE may be directly formed on the lower surface of the lens layer LSL by a metal printing method, a sputtering method, or the like. Therefore, the upper electrode layer UE may contact the lens layer LSL. For example, the upper electrode layer UE may contact portions of the lens layer LSL between the light shielding pattern BM. However, this is merely illustrative, and other methods may be applied.

Figure 13:
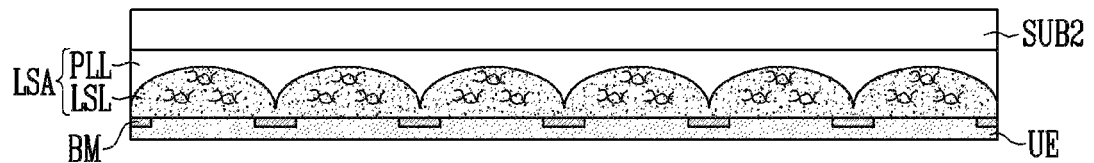
Figure 13:
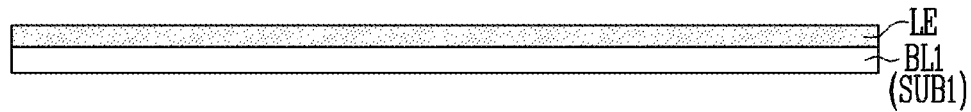

As shown in FIG. 13, the lower electrode layer LE may be deposited on the lower substrate SUB1 (e.g. the first base layer BL1). The lower electrode layer LE may include a transparent conductive material such as ITO. The lower electrode layer LE may be directly formed on the lower surface of the lower substrate SUB1 by a metal printing method, a sputtering method, or the like.

Figure 14:
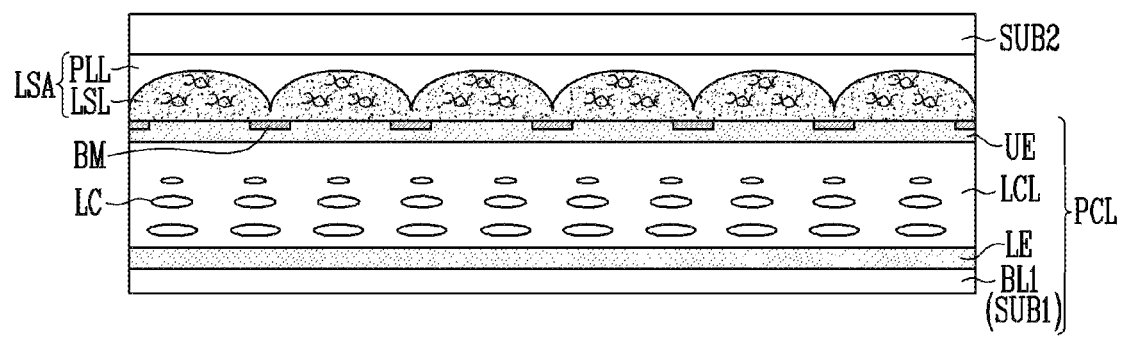

As shown in FIG. 14, the liquid crystal layer LCL including liquid crystal molecules LC may be provided between the upper electrode layer UE and the lower electrode layer LE, and the upper substrate SUB2 and the lower substrate SUB1 may be coupled to each other.

In an embodiment, the liquid crystal layer LCL may be filled between the upper electrode layer UE and the lower electrode layer LE, and an edge between the upper substrate SUB2 and the lower substrate SUB1 may be surrounded by an enclosure to be coupled thereto.

In an embodiment, the liquid crystal layer LCL formed of a liquid material including nano-sized liquid crystal molecules LC, a monomer, a dispersant, a photo-initiator, etc. may be applied between the upper electrode layer UE and the lower electrode layer LE, and then be UV cured, so the upper substrate SUB2 and the lower substrate SUB1 may be coupled to each other. In this process, monomers are combined with each other through a polymerization reaction to form binders, and certain liquid crystal molecules LC may be confined in each UV-cured binder. Therefore, the liquid crystal molecules LC may be aligned according to an electric field applied thereto. In this case, the upper substrate SUB2 and the lower substrate SUB1 may be coupled to each other without a structure for encapsulating a separate liquid crystal layer LCL.

However, this is merely illustrative, and other methods may be applied.

Thereafter, the lower substrate SUB1 and the display panel DP may be attached by the transparent adhesive material AD, so the stereoscopic image display device 1000 may be formed as shown in FIG. 3.

As such, the lens array LSA formed in the form of a film using the lens layer LSL including the reactive mesogen may be directly formed on the polarization control layer PCL, so that the substrate between the lens array LSA and the polarization control layer PCL may be removed (e.g., omitted), and the thickness of the optical structure on the display panel DP may be reduced. Accordingly, the focal distance for realizing the stereoscopic image can be reduced, so that the viewing angle can be widened, and the quality of the stereoscopic image can be improved.

In addition, since the optical bonding process of attaching substrates between the lens array LSA and the polarization control layer PCL is omitted, the manufacturing process can be simplified and the manufacturing cost can be reduced.

Figure 15:
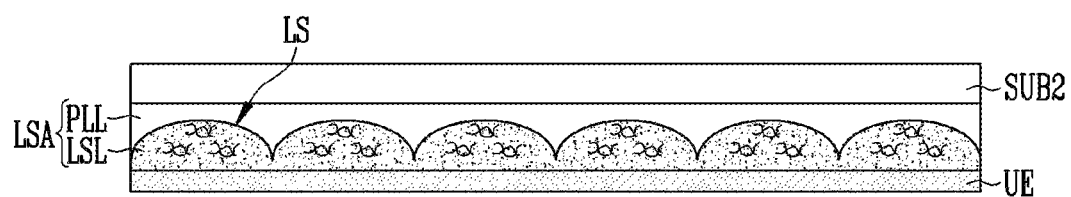
FIGS. 15 and 16 are cross-sectional views illustrating an example of a method of forming an upper electrode layer and a light shielding pattern included in the method of manufacturing the stereoscopic image display device.
Figure 16:
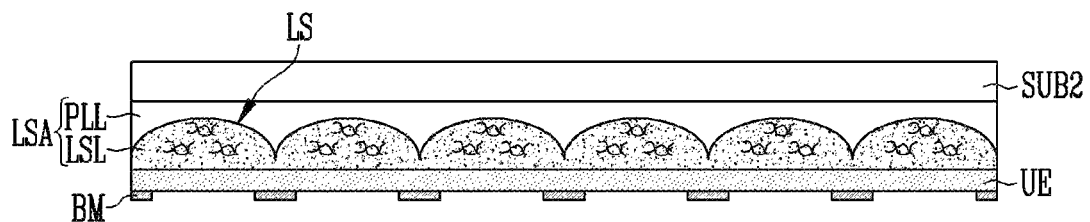

FIGS. 15 and 16 are cross-sectional views illustrating an example of a method of forming an upper electrode layer and a light shielding pattern, included in the method of manufacturing the stereoscopic image display device.

In FIGS. 15 and 16, like reference numerals will be used to designate the same components as those described with reference to FIGS. 11 and 12, and a repetitive explanation of the same components will be omitted.

Referring to FIGS. 15 and 16, the method of manufacturing the stereoscopic image display device may include patterning the light shielding pattern BM on the lower surface of the upper electrode layer UE, after depositing the upper electrode layer UE on the lower surface of the lens layer LSL.

As shown in FIG. 15, the upper electrode layer UE may be deposited on the lower surface of the lens layer LSL. For example, the upper electrode layer UE may be directly formed on the lower surface of the lens layer LSL by a metal printing method, a sputtering method, or the like.

Subsequently, as shown in FIG. 16, the light shielding pattern BM may be patterned on the lower surface of the upper electrode layer UE. The light shielding pattern BM may be formed to overlap the boundary between the lenses LS.

In other words, the manufacturing process according to FIGS. 15 and 16 may be performed in the opposite order to the process described with reference to FIGS. 11 and 12.

As described above, in the stereoscopic image display device and method of manufacturing the display device according to embodiments of the present disclosure, the substrate between the lens array LSA and the polarization control layer PCL can be removed and the thickness of the optical structure on the display panel DP can be reduced. Accordingly, the focal distance for realizing the stereoscopic image can be reduced, so that the viewing angle can be widened, and the quality of the stereoscopic image can be improved.

In addition, since the optical bonding process of attaching substrates between the lens array LSA and the polarization control layer PCL is omitted, the manufacturing process can be simplified and the manufacturing cost can be reduced.

Furthermore, since the light shielding pattern BM overlapping the boundary of the lenses LS is formed, crosstalk and image distortion caused by the interference between the lenses LS, lens aberration, etc. can be reduced.

It is to be understood that the effects of the present disclosure are not limited to those discussed above. In addition, although the present disclosure has been described with reference to embodiments thereof, it is to be understood that changes and variations may be made without departing from the spirit or scope of the present disclosure as set forth in the following claims.

What is claimed is:

1. A stereoscopic image display device, comprising:
   a display panel including pixels;
   a lens array disposed on the display panel, and refracting light provided from the display panel to form a light field, wherein the lens array includes a single lens layer which includes an optically anisotropic material, and a planarization layer which covers the lens layer and includes an optically isotropic polymer; and
   a light shielding pattern disposed on the lens array, and overlapping a boundary between lenses of the lens array,
   wherein the lens layer is disposed between the display panel and the planarization layer and includes an arrangement of the lenses as a single layer, each of the lenses having a convex shape in a direction opposite to the display panel, and
   the light shielding pattern is disposed between the lens array and the display panel.

2. The stereoscopic image display device according to claim 1, further comprising:
   a polarization control layer disposed between the lens array and the display panel.

3. The stereoscopic image display device according to claim 2, wherein the polarization control layer comprises:
a first base layer attached to the display panel by a transparent adhesive material;
a lower electrode layer disposed on the first base layer;
an upper electrode layer facing the lower electrode layer; and
a liquid crystal layer disposed between the lower electrode layer and the upper electrode layer, and including liquid crystal molecules.

4. The stereoscopic image display device according to claim 3, wherein the lens layer contacts the upper electrode layer.

5. The stereoscopic image display device according to claim 4, wherein the optically anisotropic material of the lens layer comprises a photo-cured reactive mesogen.

6. The stereoscopic image display device according to claim 4, wherein the light shielding pattern contacts an upper surface or a lower surface of the upper electrode layer.

7. The stereoscopic image display device according to claim 3, wherein the lens array further comprises:
a second base layer disposed between the upper electrode layer and the lens layer.

8. The stereoscopic image display device according to claim 7, wherein the optically anisotropic material of the lens layer comprises at least one of a photo-cured reactive mesogen and a flowable liquid crystal polymer.

9. The stereoscopic image display device according to claim 7, wherein the light shielding pattern is in contact with an upper surface of the second base layer.

10. The stereoscopic image display device according to claim 3, wherein the lower electrode layer and the upper electrode layer comprise a transparent conductive material.

11. The stereoscopic image display device according to claim 1, wherein the optically anisotropic material of the lens layer comprises a liquid crystal polymer.

12. The stereoscopic image display device according to claim 1, further comprising:
a transparent substrate disposed on the lens array.

13. A stereoscopic image display device, comprising:
a display panel including pixels;
a lens array disposed on the display panel, and refracting light provided from the display panel to form a light field, wherein the lens array includes a lens layer which includes an optically anisotropic material, and a planarization layer which covers the lens layer and includes an optically isotropic polymer;
a light shielding pattern disposed on the lens array, and overlapping a boundary between lenses of the lens array; and
a polarization control layer disposed between the lens array and the display panel,
wherein the polarization control layer comprises:
a first base layer attached to the display panel by a transparent adhesive material;
a lower electrode layer disposed on the first base layer;
an upper electrode layer facing the lower electrode layer; and
a liquid crystal layer disposed between the lower electrode layer and the upper electrode layer, and including liquid crystal molecules,
wherein the lens array further comprises:
a second base layer disposed between the upper electrode layer and the lens layer, and
wherein the light shielding pattern is disposed on a lower surface of the second base layer, and contacts the upper electrode layer.

14. A stereoscopic image display device, comprising:
a display panel including pixels;
a lens array disposed on the display panel, and refracting light provided from the display panel to form a light field, wherein the lens array includes a lens layer which includes an optically anisotropic material, and a planarization layer which covers the lens layer and includes an optically isotropic polymer;
a light shielding pattern disposed on the lens array, and overlapping a boundary between lenses of the lens array;
a base layer attached to the display panel by a transparent adhesive material;
a lower electrode layer including electrodes disposed between the base layer and the lens layer; and
an upper electrode layer disposed on the planarization layer.

15. The stereoscopic image display device according to claim 14, wherein the light shielding pattern is disposed between the electrodes of the lower electrode layer.

16. A method of manufacturing a stereoscopic image display device, comprising:
forming, on a first substrate, a planarization layer including an optically isotropic polymer to define a lens surface for a lens array;
providing a lens layer including an optically anisotropic material on the lens surface;
providing an upper electrode layer on a lower surface of the lens layer, wherein the lower surface of the lens layer is opposite to the lens surface;
forming a lower electrode layer on an upper surface of a second substrate;
providing a liquid crystal layer including liquid crystal molecules between the upper electrode layer and the lower electrode layer;
coupling the first substrate with the second substrate; and
attaching the second substrate to a display panel using a transparent adhesive material,
wherein providing the upper electrode layer comprises:
patterning, on a lower surface of the upper electrode layer, a light shielding pattern overlapping a boundary between lenses of the lens array.

17. The method according to claim 16, wherein the optically anisotropic material of the lens layer comprises a photo-cured reactive mesogen.

* * * * *